Dec. 5, 1950 C. E. LOMAX 2,532,926

PARTY LINE METERING, INCLUDING SELECTION OF THE METER PRIOR TO SIGNALING THE OPERATOR

Filed Feb. 14, 1947 4 Sheets-Sheet 1

INVENTOR.
CLARENCE E. LOMAX

BY Chas. W. Candy

ATTORNEY

INVENTOR.
CLARENCE E. LOMAX
BY Chas. W. Candy
ATTORNEY

Dec. 5, 1950 C. E. LOMAX 2,532,926

PARTY LINE METERING, INCLUDING SELECTION OF THE METER PRIOR TO SIGNALING THE OPERATOR

Filed Feb. 14, 1947 4 Sheets-Sheet 3

INVENTOR.
CLARENCE E. LOMAX

BY Chas. W. Cardy

ATTORNEY

Dec. 5, 1950 C. E. LOMAX 2,532,926

PARTY LINE METERING, INCLUDING SELECTION OF THE METER PRIOR TO SIGNALING THE OPERATOR

Filed Feb. 14, 1947 4 Sheets-Sheet 4

INVENTOR.
CLARENCE E. LOMAX

BY *Chas. W. Cody*

ATTORNEY

Patented Dec. 5, 1950 2,532,926

UNITED STATES PATENT OFFICE 2,532,926

PARTY LINE METERING, INCLUDING SELECTION OF THE METER PRIOR TO SIGNALING THE OPERATOR

Clarence E. Lomax, Chicago, Ill., assignor to Automatic Electric Laboratories, Inc., Chicago, Ill., a corporation of Delaware Application February 14, 1947, Serial No. 728,697

18 Claims. (Cl. 179—8.5)

The present invention relates in general to measured service telephone systems, and more particularly to manual party lines provided with selective indication and selective registration of telephonic calls originating at any one subscriber's station.

The principal object of the invention is to provide an improved arrangement for giving metering service to party line subscribers in a manual switchboard system.

A feature of the invention is to provide a circuit arrangement in which a small number of meter selectors will serve a large number of lines.

Another feature of the invention is to provide a circuit arrangement, whereby, as the subscriber initiates a call, the proper meter is selected and prepared before the operator is signalled.

An additional feature is the provision of a circuit arrangement and means, whereby, the operator meters the call when the called subscriber answers, using the pre-selected meter.

Another feature of the invention is that it permits the meter-selector to be released for common use upon the call being answered, instead of being held throughout the conversation.

These and other features and aspects of the invention will be pointed out and described more in detail hereinafter, reference being made to the accompanying drawings, which show by means of the usual circuit diagrams, sufficient of the apparatus of a manual telephone system to enable the invention to be explained and understood, wherein the description of the progress of a call from a party line to another and the means for registering is made.

Figures 1, 5:
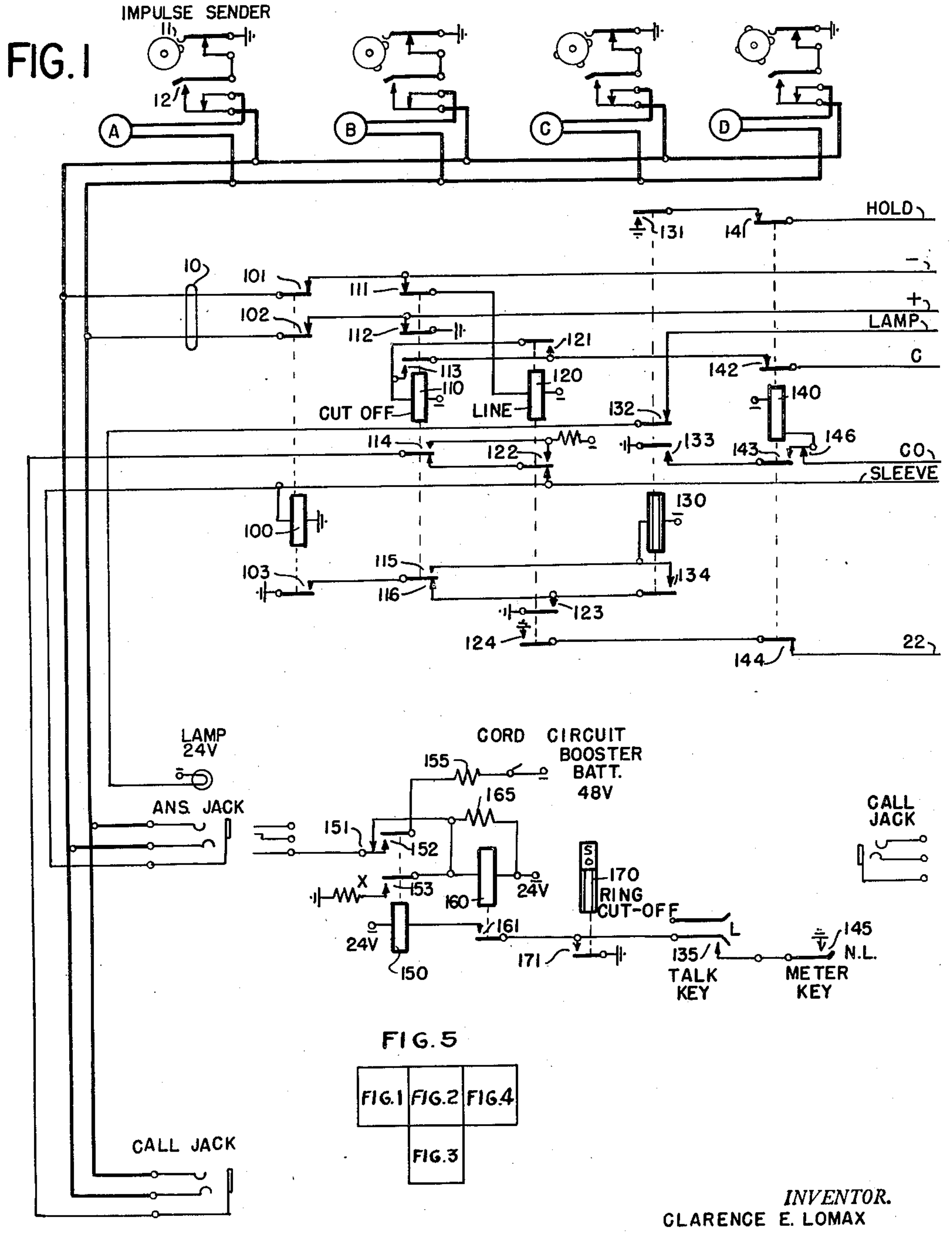

Fig. 1 of the drawings shows the line circuit for the party line, the subscribers' stations as A to D and their impulse senders, the operators' jacks and only the portion of a universal and well known cord circuit necessary for an operational description of the invention.

Figure 2:
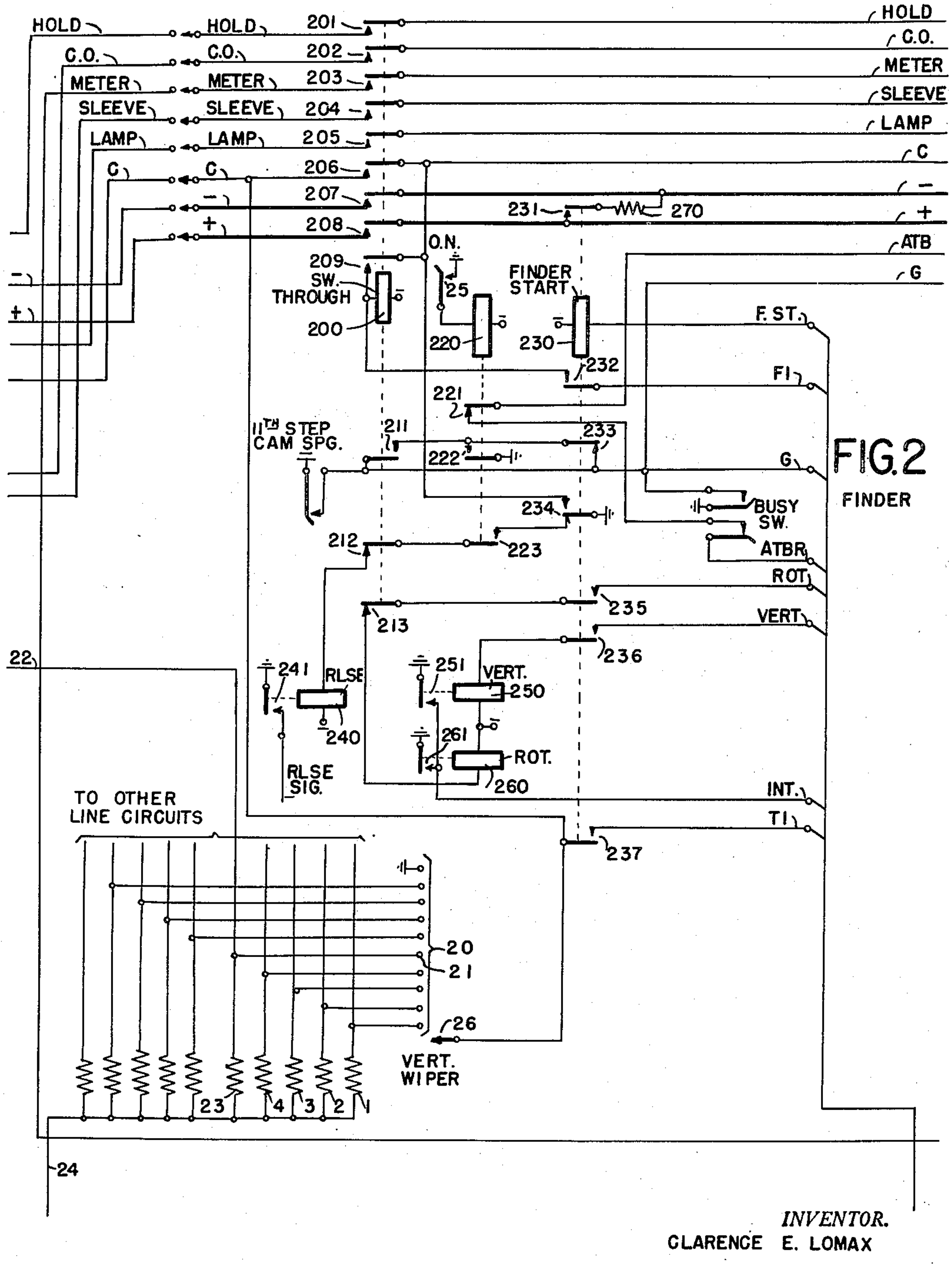

Fig. 2 of the drawings shows a line finder of the well known Strowger type, but containing modifications therein.

Figure 3:
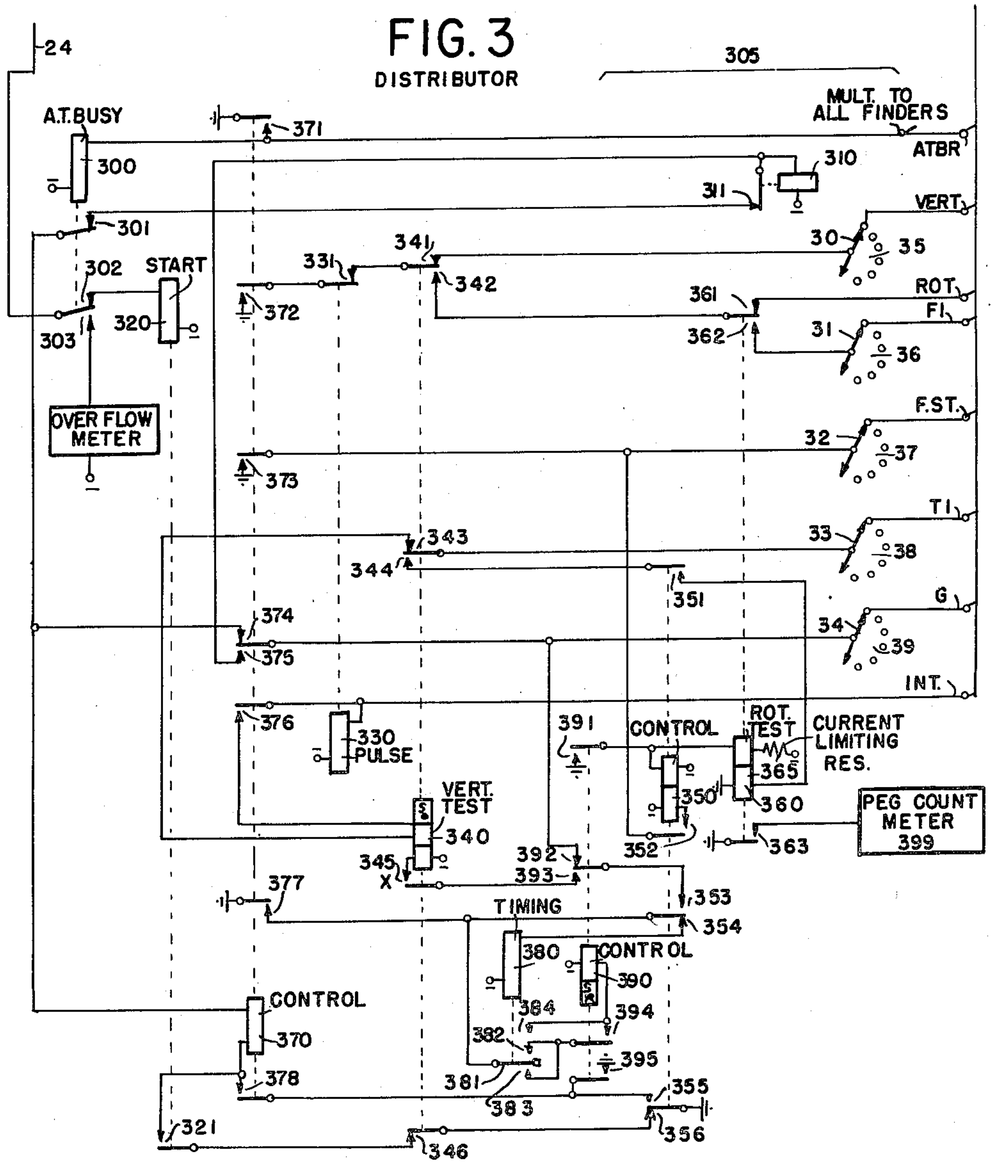

Fig. 3 of the drawings shows a distributor of the type as disclosed in the U. S. Patent No. 2,375,514 issued May 8, 1945 to Pier Bakker.

Figure 4:
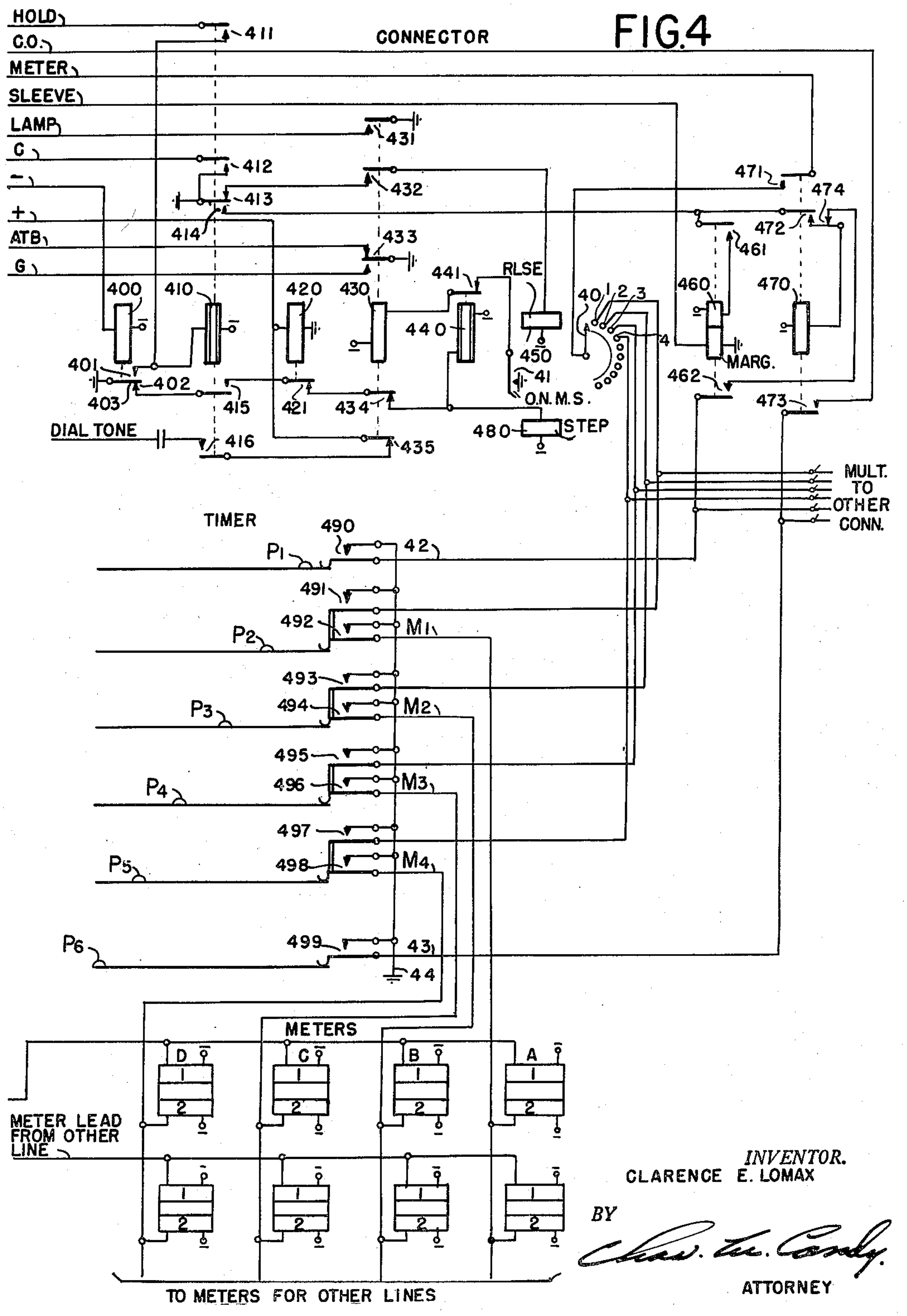

Fig. 4 of the drawings shows the connector or meter-selector, meter control and the timer, or timer control equipment, and two meter banks for separate party lines.

Fig. 5 shows how Figs. 1 to 4 inclusive should be arranged.

Figs. 2 and 4 (with the exception of the timer) are actually one unit and must be permanently associated even though they perform separate functions.

While the drawings illustrate a four-party line, it is to be understood that the circuit need not be limted to such. The drawings have been made to show that the meter selector and its equipment may serve additional party lines and register their calls on other meter banks. A plurality of calls initiated from a plurality of party lines can be recorded simultaneously.

The timer of Fig. 4 is a single unit which is used by all of the Fig. 2 and Fig. 4 equipments. Its purpose is to position and prepare the equipment for metering at the correct time, to send a plurality of meter pulses and then to release the finder after metering has been completed. The timer is so constructed as to consist of a stack of constantly rotating cams. As illustrated in the drawing, the cam contact makers such as P1 to P6 are staggered consecutively around the timers periphery. The cams are rotated at a constant speed and the contact makers are so spaced that there is a definite time interval between pulses. P1 prepares the circuit for metering. With P2 through P5 each corresponding to subscriber stations A through D on any four-party line, a single pulse is transmitted from each of the contact makers, but at different time intervals after the operation of P1. P6 releases the finder from the calling line after the completion of metering and is the last of that series of actuated contact makers.

The impulse sender as illustrated at the manual telephone, and used for selecting the station meter, is of the type as disclosed in Patent 2,463,717 issued to Theodore C. Riebe on March 8, 1949. The impulsers located at each station, transmit a different number of pulses corresponding to that station's predetermined identification signal.

It will be noted that the meters used are special, in that each meter has two coil cores and are of the shunt-field construction. The shunt field arrangement is used because matched pulses are used for metering and the shunt field arrangement permits fewer conductors to be used for metering. The meters assigned to one party line have their number 1 coils commoned, i. e., they may either be connected in series or parallel. The A subscribers of each party line have their number 2 coils commoned, the B subscribers have their number 2 coils commoned, etc. The number 2 coils receive their pulses directly from the timer, whereas the number 1 coils receive their pulses indirectly from the timer after their passage through the finder. If the commoning of all the number 2 coils of the meter causes too heavy a load on the contacts of the timer, the common may be broken and additional contacts installed.

The invention, both as to its organization and method of operation, together with further objects and advantages thereof, will best be understood by reference to the specification taken in connection with the accompanying drawings. The handling of a call from its initiation to its completion will be discussed in the ensuing operational description.

As a subscriber at either of stations A to D removes the receiver, a loop circuit is closed over line 10 and a circuit is completed through the winding of line relay 120. Line relay 120, at contacts 121 prepares a circuit for relay 110. At contacts 122 a battery potential is applied to the sleeve of the call jack to mark this line busy. At contacts 123 it prepares an additional ground potential for the winding of relay 130, and at contacts 124 a ground potential is applied to vertical bank conductor 22 and to the fifth contact 21 of vertical bank set 20. Contacts 124 also energize distributor start relay 320, in which the circuit may be traced from ground at contacts 124, through closed contacts 144, vertical bank conductor 22, resistor 23, conductor 24, contacts 302, and through the winding of relay 320 to battery. Start relay 320 now closes contacts 321, completing the circuit for control relay 370. The circuit for relay 370 may be traced from ground at contact 356, through contacts 346 and 321, the winding of relay 370, contacts 301 and 311, and through the winding of magnet 310 to battery. The windings of magnet 310 and relay 370 are connected in series, but the resistance of the winding of 370 is high as compared with that of magnet 310, and accordingly, this magnet does not operate when energized in the circuit just traced.

In operating, control relay 370 closes its contacts 371 to complete an obvious multiple circuit for energizing the all-trunks-busy relay 300. At contacts 372, an operating circuit is prepared for the vertical magnet 250 of the Strowger switching mechanism embodied in the finder. At its contacts 373, an operating circuit is completed for finder start relay 230, this circuit extending from ground by way of contacts 373 to wiper 32 and its engaged contact, conductor F. ST., and the winding of relay 230 to battery. At its contacts 374, the relay 370 opens a point in one of the operating circuits for the magnet 310. At its contacts 375, the relay 370 prepares an alternative operating circuit for this magnet. At its contacts 376, the relay 370 prepares an operating circuit for the vertical test relay 340 and a locking circuit for the pulsing relay 330. At its contacts 377, the relay 370 completes a circuit for energizing the winding of the timing relay 380, this circuit extending from ground by way of contacts 377, contacts 354, and the winding of relay 380 to battery. At its contacts 378, the relay 370 prepares a locking circuit for itself.

The timing relay 380, upon operating, moves its armature 381 and its contacts 382 and 384 to complete an obvious circuit through the contacts 377 for energizing the slow-to-operate relay 390. The relay 390 now operates and locks to ground over a path including its contacts 394, contact 382, the armature 381 and the contacts 377. At its contacts 395, the relay 390 completes the prepared locking circuit for the control relay 370, this circuit extending from ground by way of contacts 395 and 378, the winding of relay 370, the contacts 301 and 311, and the winding of magnet 310 to battery. At its contacts 393, the relay 390 prepares a locking circuit for the vertical test relay 340. At its contacts 392, the relay 390 opens a point in one of the available operating circuits for the magnet 310. At its contacts 391, the relay 390 completes a circuit for energizing the upper winding of control relay 350 in parallel with the upper winding of the relay 360. It will be noted that the portion of this circuit which includes the upper winding of relay 360 also serially includes the current limiting resistor 365. The current traversing this portion of the circuit is insufficient to cause the operation of the relay 360, but serves to render this relay exceedingly fast to operate when its lower winding is subsequently energized.

The relay 350, upon operating, locks to ground over a path including its contacts 352, and contacts 373. At its contacts 353, the relay 350 further prepares the locking circuit for the vertical test relay 340. At its contacts 351, the relay 350 prepares a circuit for energizing the lower winding of the rotary test relay 360. At its contacts 355, the relay 350 completes a multiple locking circuit for the control relay 370, this circuit extending from ground by way of contacts 355, contacts 378, the winding of control relay 370, the contacts 301, contacts 311 and the winding of magnet 310 to battery. At its contacts 356, the relay 350 opens the previously traced operating circuit for the relay 370. At its contacts 354, the relay 350 opens the above-traced circuit for energizing the winding of the timing relay 380. When this winding is thus deenergized, the weighted armature 381 is released and starts to vibrate through its neutral position between two extreme positions, wherein, the contacts 382 and 383 are respectively engaged thereby. Each time the armature 381 engages one of its two associated contacts 382 and 383, the locking circuit for the relay 390 is completed. Due to its slow-to-release characteristics, this relay remains in its operated position until such time as the amplitude of vibration of the armature 381 is decreased sufficiently to prevent the engagement thereof with either of the two contacts 382 and 383. Thus a timing interval is measured through operation of the timing relay 380. During this interval the two relays 390 and 350 are held operated so that the operation of the finder to seize the calling line 10 may proceed.

When the finder start relay 230 is energized in the above-traced circuit, operation of the finder to search for the calling line 10 is initiated. In operating, this relay closes its contacts 231 to bridge the resistor 270 across the link negative and positive conductors and thus cause the energization and operation of the line relays 400 and 420, this circuit extending from ground through the winding of relay 420, contact 231, resistor 270, and the winding of relay 400 to battery. At its contacts 401, the relay 400 completes the circuit for relay 410, this circuit extending from ground at contacts 401 through the winding of relay 410 to battery. At its contacts 411, the relay 410 prepares its own holding circuit. At its contacts 412, the relay 410 applies a ground potential to the C conductor. At its contacts 413, the relay 410 opens the circuit for release magnet 450. At its contacts 414 a circuit is prepared for relays 460 and 470. At its contacts 415 a circuit is prepared for relay 440 and magnet 480. At its contacts 416, the relay 410 prepares a circuit for transmission of dial tone to the calling subscriber. At its contacts 421, the relay 420 further prepares the circuit for relay 440 and magnet 480.

Continuing with the operation of relay 230, said relay at its contacts 237 applies a ground potential from conductor C to conductor T1. At its contacts 232, the relay 230 prepares a circuit for switch through relay 200. At its contacts 234, the relay 230 prepares a holding circuit for relay 200. At its contacts 235, the relay 230 prepares a circuit for rotary magnet 260.

At the same time that relays 400 and 420 were energizing, the operating circuit of vertical magnet 250 was completed at contacts 236, of relay 230, this circuit extending from ground at contacts 372, contacts 331, 341, wiper 30 and its engaged contact 35, contacts 236 and the winding of magnet 250 to battery. When energized in this circuit, the magnet 250 elevates its wipers to a position opposite the first level of bank contacts in the associated contact field, and closes its contacts 251 to complete the prepared operating circuit for the pulsing relay 330. This circuit extends from ground by way of the contacts 251, interrupter lead INT, and the winding of relay 330 to battery. Incident to the vertical off-normal movement of the wipers, the off-normal springs 25 are closed, completing the circuit to relay 220 in an obvious manner. In operating, the relay 330 opens its contacts 331 to deenergize the magnet 250. In releasing, magnet 250 opens its contacts 251 to deenergize relay 330. The relay 330, upon restoring closes its contacts 331 to again energize magnet 250. In reoperating, magnet 250 elevates its wipers again and closes its contacts 251 to reenergize relay 330. The inter-action between the magnet 250 and relay 330 continues until its wiper 26 is elevated to a position opposite the marked level of contacts such as 21 in the associated contact field such as 20.

In operating, at its contacts 221, the relay 220 opens the all-trunks-busy circuit ATB individual to the illustrated link and constituting one of the branch circuits over which the all-links-busy relay 300 is energized. At its contacts 222, the relay 220 prepares an additional ground potential to the G conductor. At its contacts 223, the relay 220 prepares a circuit for release magnet 240.

When wiper 26 engages marked contact 21 and when magnet 250 disconnects ground from the INT conductor, a circuit is immediately completed for energizing the upper winding of the vertical test relay 340 in series with the winding of the relay 330, this circuit extending from ground by way of contacts 124 and 144, conductor 22, contact 21, wiper 26, contacts 237, conductor T1, wiper 33 and its engaged contact 38, contacts 343, the upper winding of relay 340, the contacts 376 and the winding of relay 330 to battery. The current traversing this circuit is sufficient to maintain the pulsing relay 330 in its operated position, whereby further operation of the magnet 250 is prevented, and to cause the operation of the vertical test relay 340.

It will be noted that during the vertical movement of the finder wipers, a circuit including the resistor 23 and one of the resistors 1, 2, 3 or 4, etc., is repeatedly completed for energizing the relay 330 and the upper winding of relay 340 in series. This circuit is initially completed incident to the first vertical step of the finder wipers and extends from ground by way of contacts 124, and 144, conductor 22, resistors 23 and 1 in series, the engaged first contact of contact set 20 and wiper 26, contacts 237, conductor T1, the wiper 33 and engaged contact 38, contacts 343, the upper winding of relay 340, contacts 376 and the winding of relay 330 to battery. It is altered successively to include the resistors 2, 3 and 4 in series with the resistor 23 incident to the second, third and fourth vertical steps of the finder wipers. The current traversing this circuit is, however, insufficient to cause the operation of the vertical test relay 340 or to prevent the release of the pulsing relay 330.

The vertical test relay 340, upon operating, first locks up in a circuit which includes its lower winding, its preliminary make contacts 345, the contacts 393, contacts 353 and contacts 377. After this locking circuit is completed, the relay 340 opens its contacts 341 to interrupt the above-traced operating circuit for the vertical magnet 250, and closes its contacts 342 to prepare the operating circuit for the rotary magnet 260. At its contacts 343, the relay 340 interrupts the above-traced circuit for energizing its own upper winding in series with the winding of the pulsing relay 330, whereby the latter relay is deenergized. At its contacts 344, the relay 340 further prepares the operating circuit for the rotary test relay 360.

The pulsing relay 330, upon restoring, closes its contacts 331 to complete the prepared operating circuit for the rotary magnet 260, this circuit extending from ground by way of the contacts 372, 331, 342, 361, conductor ROT, contacts 235, 213, and the winding of the magnet 260 to battery. When energized in this circuit, the magnet 260 operates to rotate the finder wipers into engagement with the contacts forming the first contact set of the selected fifth level, and to rotate the wiper 26 out of engagement with the contact 21. Upon operating, the magnet 260 also closes its contacts 261 to complete the previously traced operating circuit for the pulsing relay 330. The relay 330 now operates and opens its contacts 331 to deenergize the magnet 260. This magnet, in restoring, opens its contact 261 to deenergize the relay 330. The inter-related operation of the magnet 260 and relay 330 continues until the finder wipers are rotated to engage the contacts at which the conductors of the calling line 10 are terminated. It will be understood that the wipers are rotated one step each time the rotary magnet 260 is energized.

The rotary movement of the wipers is arrested when the finder test wiper at finder test conductor C is operated to engage the contact terminating the line test conductor C of the calling line. At this time the above mentioned circuit for energizing the lower winding of the rotary test relay 360 is completed, this circuit extending from ground by way of the lower winding of relay 360, contacts 351, 344, wiper 33 and its engaged contact 38, conductor T1, contact 237, finder test conductor C and finder test wiper, contact 142, 121, and the winding of relay 110 to battery. When energized in this circuit the relay 360 immediately operates and opens its contacts 361 to interrupt the above-traced operating circuit for the rotary magnet 260, whereby rotary movement of the wipers is arrested. At its contacts 363, the relay 360 completes an obvious circuit for energizing the operating magnet of the peg count meter 399, whereby the call is registered by this meter in the usual manner. At its contacts 362 the relay 360 prepares the operating circuit for the switch-through relay 200. Shortly following the operation of the rotary test relay 360 to perform the functions described above, the pulsing relay 330 restores and closes its contacts 331 to complete the prepared operating circuit for the switch through relay 200, this circuit extending from ground by way of the contacts 372, 331, 342, 362, wiper 31 and its engaged contact 36, conductor F1, contacts 232 and the winding of relay 200 to battery.

In operating, the relay 200 locks to ground by way of two channels, one being through its contacts 209, conductor C and contacts 412, the other being through its contacts 209, and contacts 234. At its contacts 208 and 207 the relay 200 extends the calling loop circuit to the connector portion of the circuit in an obvious manner. At its contacts 211, the relay 200 connects the guard conductor G to ground by way of contacts 222, and a circuit is completed for energizing magnet 310, this circuit extending from ground by way of contacts 222, 211, conductor G, wiper 34 and its engaged contact 39, contacts 375 and the winding of magnet 310 to battery. At its contacts 212, the relay 200 opens a point in the operating circuit for the release magnet 240. At its contacts 213, the relay 200 opens a point in the operating circuit for the rotary magnet 260. At its contacts 206, the relay 200 applies a ground potential on the C conductor of the line circuit and completes the circuit for energizing cut off relay 110, this circuit extending from ground at contacts 234 to contacts 206, or from ground at contacts 412 to contacts 206, then, from contacts 206, finder test wiper, contacts 142, contacts 121 and through the winding of relay 110 to battery. At its contacts 205, the relay 200 prepares an operating circuit for lighting the operators signal lamp. At its contacts 204, the relay 200 prepares an operating circuit for the marginal relay 460 by way of the sleeve conductor. At its contacts 203, the relay 200 prepares an energizing circuit for the number one parallel connected winding of the meters associated with the calling line. At its contacts 202, the relay 200 prepares an operating circuit for the relay 140. At its contacts 201, the relay 200 prepares a holding circuit for the relay 410.

In operating, the relay 110 closes its contacts 113 and thus maintains its own operating circuit in preparation to the subsequent deenergization of line relay 120. At its contacts 114, the relay 110 maintains a battery potential on the sleeve conductor to the call jack, in preparation to the subsequent deenergization of relay 120. At its contacts 115, the relay 110 prepares a circuit for relay 130. At contacts 111 and 112, the relay 110 opens the circuit to line relay 120.

At the same time that relay 110 operates, magnet 310 becomes operative and opens its contacts 311, thereby opening the circuit to deenergize relay 370. As relay 120 is deenergized it removes the ground potential from start conductor 22 at contacts 124, and opens the circuit to deenergize relay 320. Relay 370, upon deenergizing, removes ground from the conductor at its contacts 373, which opens the circuit to relays 230 and 350. As relay 370 is deenergized it opens the circuit for magnet 310 at its contacts 375, and upon deenergization, the magnet 310 advances the wipers of the link selecting switch 305 one step, or until the distributor has found an idle link.

Referring again to relays 410 and 200, it has been previously stated that the operation of relay 410 prepared a circuit for applying dial tone to the positive conductor of the seized link, and that the operation of relay 200 completed the connection to the subscriber's line. Therefore, as the dial tone becomes audible to the calling party, it is an indication that the impulse sender may be operated.

Assuming that the impulse sender to be operated, is designed to transmit only one impulse and the subscriber is located at station A, the following operation will be more readily understood. As the impulse sender is operated, the shunt springs such as 12 opens the line loop and grounds the negative line, the pulse springs such as 11 interrupt the negative line and a pulse follows, causing the relays 400 and 420 to be deenergized momentarily. The relay 400, during deenergization, opens its contacts 401 and closes its contacts 402. At its contacts 401, the relay 400 opens the circuit of relay 410, but due to its slow-to-release characteristics this relay tends to maintain itself in its operative position. At its contacts 402, the relay 400 prepares an operative circuit for the relay 440 and stepping magnet 480 of the minor switch. The relay 420, during deenergization, closes its contacts 421 and completes the circuits to relay 440 and magnet 480, these circuits extending from ground at contacts 402, through contacts 415, 421, 434 and through the winding of relay 440 to battery, and through the winding of magnet 480 to battery, respectively. At its contacts 441, the relay 440 maintains an open circuit for the relay 430. The stepping magnet 480, of the minor switch, rotates its wipers one step and deenergizes, leaving its wiper on the number 1 contact. At the same time the magnet 480 closes its off-normal springs 41 to ground, thus preparing a circuit for relay 430. Relays 400 and 420 have again energized after operation of the impulse sender at sub-station A, and relay 440 has deenergized. Upon deenergization, the relay 440 completes the circuit to relay 430 through its closed contacts 441 in an obvious manner.

In operating, the relay 430 opens its contacts 435 and disconnects dial tone from the subscribers' line. At its contacts 434, the relay 430 further opens the circuit to relay 440 and magnet 480. At its contacts 433, the relay 430 removes the ground from the already open ATB conductor, and applied ground to the guard conductor G for busying the finder. At its contacts 432, the relay 430 prepares a circuit for the release magnet 450. At its contacts 431, the relay 430 completes the circuit causing the operators signal lamp to light, this circuit extending from ground by way of contacts 431, the link lamp conductor, contact 205, finder lamp conductor and finder wiper, contacts 132, and lamp filament to battery.

Upon receiving the lamp signal, the operator plugs into the answer jack to answer the call. As hereinbefore mentioned, the cord circuit is universal and its operation is well known, therefore its operation only as to operation of the meter will be discussed. As the plug is inserted into the answer jack, an energizing circuit is completed for relays 100 and 160, this circuit extending from ground at relay 100, through its winding, the sleeve conductor, the sleeve of the answer jack, the sleeve of the plug, contacts 151, and through the winding of relay 160 to battery. At its contacts 161, the relay 160 prepares an operating circuit for the relay 150. At its contacts 101 and 102, the relay 100 disconnects the line 10 from the finder and connector and opens the circuits to relays 400 and 420 which restore. The release of relays 400 and 420 are without effect at this time. At its contacts 103, the relay 100 completes the operating circuit for the relay 130, this circuit extending from ground at its contacts 103, through contacts 115 and the winding of relay 130 to battery. At its contacts 134, the relay 130 prepares its own holding circuit. At its contacts 133, the relay 130 prepares a holding circuit for the relay 140. At its contacts 132, the relay 130 opens the lamp circuit, and at its contacts 131, the relay 130 completes a holding circuit for the slow to release relay 410 in an obvious manner.

The call may now be metered by one of two methods, depending on whether a magneto or common battery line is being called. If a magneto line is being called the talk key is closed, preparing the energizing circuit for the relay 150 at contacts 135. At the time the called party answers, the meter key for applying a ground potential at contacts 145 is closed, thereby completing the energizing circuit to relay 150 in an obvious manner. If a common battery line is being called, the ring cut-off relay 170 operates when the called party answers and a ground potential is applied at contacts 171 to complete the energizing circuit for relay 150 in an obvious manner.

The lower winding of marginal relay 460 is constructed so as to be inoperative with the application of 24 volts. In operating, the relay 150 completes a holding circuit for the relay 160 at its contacts 153, this circuit extending from ground at contacts 153 and through the winding of relay 160 to battery. As the resistance of resistor 165 is greater than that of the winding of relay 160, the circuit is completed through the relay's winding. At its contacts 152, the relay 150 completes a circuit for applying 48 volts booster battery to the sleeve conductor and thereby energize relay 460, this circuit extending by way of ground through the lower winding of relay 460, the link sleeve conductor, contacts 204, the finder wiper, the sleeve conductor of the line circuit, sleeve of the jack, sleeve of the answer jack, the sleeve of the plug, contacts 152, resistor 155 and to booster battery. At its contacts 151, the relay 150 removes 24 volt battery from the sleeve conductor and opens the original circuit of relay 160 now held operated over contacts 153.

In operating its contacts 461, the relay 460 completes its own locking circuit, which extends by way of ground at contacts 414, contacts 461 and the upper winding of relay 460 to battery. It will be noted that relay 150 has deenergized, as it has only been momentarily energized by momentary operation of relay 170 or the meter key, such operation being long enough to energize the lower winding of relay 460, thereby causing it to operate, while at its contacts 151, the relay 150 restores 24 volt battery to the sleeve conductor. At its contacts 462, the relay 460 prepares a circuit for the relay 470 which is ineffective until the timer cam P1 reaches a predetermined position.

As the contact maker P1 of the constantly rotating timer closes its contacts 490 at the beginning of a cyclic operation, an operating circuit is completed to the relay 470, extending by way of ground at 44 through contacts 490, conductor 42, contacts 462, 474 and the winding of relay 470 to battery.

In operating, the relay 470 closes its contacts 472 and completes its own locking circuit, which extends by way of ground at contacts 414, contacts 472 and the winding of relay 470 to battery. At its contacts 471, the relay 470 prepares the circuit for the energization of all the number 1 parallel connected coils of the meters A to D associated with the calling line. After an interval, contact maker P2 of the timer closes its contacts 491 and 492 and completes simultaneous circuits to the number 1 coils of all the meters associated with the calling line, and to the number 2 coils of all A meters respectively, thereby causing the A meter associated with the calling line to register. The first circuit extending by way of ground at 44, contact 491, to contact 1 of the minor switch, wiper 40, contacts 471, meter conductor, contacts 203, finder wiper, meter conductor and the number 1 windings of meters A to D to battery. The second circuit extending by way of ground at 44, contacts 492, conductor M1 and through the number 2 coils of all the A meters to battery.

From the foregoing description it will be seen that coils 1 of meters A, B, C and D associated with the calling line have been energized over the meter lead individual to the calling line and that simultaneously therewith, coils 2 of all meters A of all lines have also been energized. Since the meters are of the shunt-field type, it therefore takes the simultaneous energization of both windings to operate the meters. In this case, since the meter A of the calling line is the only meter having both its number 1 and number 2 coils energized, meter A is, therefore, the only meter which is operated.

As the timer continues to advance, the cams P3, P4 and P5 operate their respective contacts without effect at this time since no circuit is completed through contacts 2, 3 or 4 at the minor switch. However, circuits are completed over conductors M2, M3 and M4 in sequence for energizing the number 2 coils of the meters, but since no circuits are simultaneously completed for the number 1 coils of such meters, no meter operations take place.

The timer in Fig. 4 is common to a number of finder-connector links, such as shown in Figs. 2 and 4, and it may happen that during any one cyclic operation of the timer two or more calls could be metered, each such call being metered thru a different finder-connector link and the particular meters operated being dependent upon the position of the minor switch wiper 40 in such links, such wipers 40 selecting the time, as determined by cams P2, P3, P4 and P5, when the matched metering pulses are to simultaneously operate both coils of the shunt field meters.

At its contacts 473, the relay 470 prepares an operating circuit for the relay 140. When the contact maker of cam P6 closes its contacts 499 at the end of this cyclic operation of the timer, an energizing circuit is completed for the relay 140, this circuit extending by way of ground at 44, contacts 499, 473, C. O. link conductor, contacts 202, finder wiper, C. O. line circuit conductor, contact 146 and the winding of relay 140 to battery. At its contacts 144, the relay 140 opens the circuit of the test lead 22. At its contacts 143, the relay 140 completes its own locking circuit in an obvious manner. At its contacts 142, the relay 140 opens the circuit to relay 110. At its contacts 141, the relay 140 opens the holding circuit to relay 410. The relay 410 restores contacts 414 and opens the locking circuits of relays 460 and 470, thereby deenergizing them. The relay 410 restores contacts 412 and opens the holding circuit of relay 200, thus deenergizing it. Upon deenergization of relay 410, its contacts 413 close to complete an energizing circuit for the release magnet 450, which extends by way of ground at contacts 413, 432 and the winding of magnet 450 to battery. The release magnet 450 restores the minor switch wiper 40 and its off-normal contacts 41, thereby opening the circuit to deenergize the relay 430. The relay restores its contacts 432 to open the circuit and deenergize the magnet 450. Upon restoring, the relay 200 restores its contacts 212 to complete an energizing circuit for the finder release magnet 240, which extends by the way of ground at the contacts 234, 223, 212 and the winding of magnet 240 to battery. The magnet 240 restores the finder wipers and its off-normal contacts 25, thereby opening the circuit to deenergize the relay 220. The relay 220 restores its contacts 223 to open the circuit and deenergize the magnet 240.

The metering equipment comprising the finder-connector link in Figs. 2 and 4 is now released and may be used on subsequent calls.

After the completion of the call and when the subscribers replace their receivers, the operator withdraws the plugs of the cord circuit, thereby opening the circuits of relays 160 and 100. Upon deenergizing, the relay 100 restores and connects the line 10 to its line relay 120 at contacts 101 and 102, so that future calls by the subscribers may be completed. The relay 100 restores its contacts 103 and opens the circuit to deenergize the relay 130, which at its contacts 133 opens the locking circuit of relay 140 which likewise restores.

The entire system is at rest and in a normal position of readiness for the completion of future calls.

The call jack has been shown to illustrate the circuit of an incoming call to one of the subscribers A to D. The operator plugs into the call jack, completing the circuit to energize the relay 100, which extends by way of ground at relay 100, through its winding, contacts 122, 114, sleeve of jack and sleeve of plug and through the winding of a relay such as 160 to battery.

The operation of relay 100 at this time disconnects line relay 120 at contacts 101 and 102 to prevent a finder-connector link, such as shown in Figs. 2 and 4, from being operated and connected with the called line as it is not desired to charge the called subscriber with an incoming call.

While one embodiment of the invention has been disclosed, it will be understood that various modifications may be made therein which are within the true spirit and scope of the invention.

Having described the invention, what is considered new and desired to have protected by Letters Patent will be pointed out in the appended claims.

What is claimed is:

1. In a telephone system, a party line having a plurality of stations, an operator's position associated therewith, a meter at the exchange for each station on the line, an impulse sender at each of said stations, a switching device for locating said line when calling, means responsive to the initiation of a call by a station on said line for operating said switching device to connect with said line, means responsive to the subsequent operation of said impulse sender for selecting said calling station's individual meter, and means responsive to the selection of said meter for signalling said operator's position.

2. In a manual telephone system, a plurality of manual party lines, a plurality of stations on each line, an individual identification impulse sender at each of said stations for identification purposes only, a finder switch operated responsive to the initiation of a call by one of said stations for finding and connecting with the calling party line, circuit means controlled responsive to the manual operation of said individual impulse sender at said calling station for transmitting an identification signal corresponding to said calling station to said operated finder switch, an operator's position, a plurality of signals at said operator's position and each being individual to a different one of said lines, and other circuit means associated with said finder switch completed only in response to the receipt of said identifying signal for operating said signal individual to said calling line at said operator's position to inform the operator thereat that a call has been initiated over said line.

3. In a telephone system, an operator's position, a plurality of party lines terminating thereat, a plurality of cord circuits thereat adapted to be connected to said lines for answering calls thereover, a plurality of subscriber stations connected to each of said lines, an individual meter for each of said stations associated with said lines, switching apparatus common to said lines, means responsive to the initiation of a call on one of said lines for operating said apparatus to find the calling line and connect therewith, means for transmitting a station identification signal from the calling station, means in said apparatus responsive to the receipt of said station identification signal for selecting the calling stations' individual meter, means responsive to the selection of the calling station's meter for signalling said operator's position to answer said calling line, and means responsive to said answering and to the operation of one of said cord circuits for preparing an energizing circuit to said calling stations' meter.

4. In a telephone system, a plurality of party lines each having a plurality of stations thereon, a meter for each station, a first and a second winding for each meter, a plurality of metering circuits comprising an individual meter conductor for each said party line and a plurality of common meter conductors, each individual meter conductor connected to the first windings of all meters individual to the corresponding party line, the first of said common meter conductors connected to the second windings of all meters corresponding to the first stations on said lines and the respective remaining common meter conductors similarly connected to the second windings of the station meters corresponding respectively to the second, third and fourth stations on said lines, a plurality of switching devices operated to find said lines when calling and to connect with the individual meter conductors corresponding to the calling lines, a timing device for sequentially activating said common meter conductors to energize the second windings of said meters and for simultaneously therewith activating the individual meter conductors connected through said switching devices to energize the first windings of the meters of the calling lines, and means for operating only those meters having their first and second windings simultaneously energized.

5. In a telephone system, a party line having a plurality of stations thereon, a meter for each station, a plurality of meter conductors each corresponding to a station on said line and each connected to a corresponding station meter, a line conductor individual to said line connected to all said meters, common metering apparatus, means responsive to a calling one of said stations initiating a call for operating said apparatus to find said calling line and to connect with said line conductor, means controlled by the calling station for transmitting a station identification signal to said connected apparatus, timing means having successive predetermined time intervals corresponding, respectively, to each of said stations on said line, means in said timing means operated during each said predetermined interval for activating the corresponding meter conductor to thereby sequentially activate said meter conductors, means in said apparatus responsive to the receipt of said identification signal for selecting a particular one of said predetermined intervals corresponding to said calling station, means for activating said line conductor during said selected predetermined interval, and means responsive to the activation of said meter conductor corresponding to the calling station and the simultaneous activation of said line conductor during said selected predetermined interval for operating the meter corresponding to said calling station.

6. In a telephone system, a party line having a plurality of stations thereon, a meter for each station, a plurality of meter conductors each corresponding to a station on said line and each connected to a corresponding one of said meters, a line conductor individual to said line connected to all said meters, means for sequentially activating said meter conductors at predetermined timed intervals, means for activating said line conductor at a corresponding one of said predetermined timed intervals dependent upon which one of said stations initiates a call, and means responsive to the activation of one of said meter conductors and the simultaneous activation of said line conductor for operating only the corresponding meter.

7. In a telephone system, an exchange, a party line having a plurality of stations thereon terminating at said exchange, a shunt-field meter for each station and located in said exchange, a first and a second winding for each meter, a common conductor connected to all said first windings of said meters, a plurality of individual conductors each being individually connected to said second windings of said meters, means for energizing said windings over said conductors, and means for operating said meters only in case both said first and second windings are simultaneously energized in opposing directions.

8. In a telephone system, a plurality of party lines, a plurality of stations on each line, a meter individual to each station, metering circuit for operating said meters; a common timer having successive cycle operations each cycle comprising respectively a start period, a plurality of consecutive meter periods and a release period, and said consecutive meter periods corresponding respectively to the first, second, third and fourth stations on said party lines; means for completing a plurality of talking connections between calling ones of said stations and called ones of said stations after a start period and during a cycle operation of said timer, means responsive to said timer reaching its start period in its next cycle operation for preparing the metering circuits of all calling stations having established a talking connection during said preceding cycle operation of said timer, means responsive to said timer reaching its first station meter period for completing the prepared metering circuits of all first station meters individual to said calling stations included in said established talking connections to operate such first station meters, means responsive to said timer reaching its second station meter period for completing the prepared metering circuits of all second station meters individual to said calling stations included in said established talking connections to operate such second station meters, means responsive to said timer reaching its third station meter period for completing the prepared metering circuits of all third meters individual to said calling stations included in said established talking connections to operate such third station meters, means responsive to said timer reaching its fourth station meter period for completing the prepared metering circuits of all fourth station meters individual to said calling stations included in said established talking connections to operate such fourth station meters, and means responsive to said timer reaching its release period for releasing said prepared metering circuits to prevent meter operations thereover on subsequent cycle operations of said timer.

9. In a telephone system, a plurality of subscribers' lines, a metering circuit individual to each of said lines, a plurality of switching devices, means responsive to the initiation of a call on any one of said lines for automatically operating any idle one of said switching devices to find the calling line, subscriber controlled means for preparing the individual metering circuit of said calling line, a timing means common to said switching devices, means in said timing means and in said operated switching device for further preparing said calling line's individual metering circuit, means in said timing means for thereafter transmitting a metering pulse to said calling line's individual metering circuit to register such call, means in said timing means operative shortly after transmission of said metering pulse to transmit a release pulse, and means responsive to said release pulse for releasing said operated switching device.

10. In a telephone system, a plurality of party lines, a plurality of stations on each of said lines, a switching device common to said lines operated responsive to the initiation of a call by a calling station on one of said lines for finding said calling line, a meter individual to each of said stations, means for selecting the meter individual to the calling stations, means for thereafter completing a talking connection between said calling station and a called one of said stations, means for operating said selected meter when the talking connection between said calling and called stations is completed to register the call, and means automatically effective shortly after said registration for releasing said switching device and said selecting means for common use by other calling ones of said stations while said talking connection between said calling and called stations is maintained.

11. In a manual telephone system, a manual party line, a plurality of stations on said line, a called line, a switching device operated in response to a station on said party line initiating a call to said called line for finding and connecting with said calling line, an impulse sender at said calling station for transmitting an identification signal to said connected switching device, a meter individual to each station, means in said switching device operated in response to said signal for selecting the meter individual to said calling station, an operator's position and manual equipment for thereafter completing a talking connection from said calling station to said called line, means for operating said selected meter when said talking connection is completed, and means automatically effective shortly after said meter operation for releasing said switching device and said selecting means from said calling line while maintaining said talking connection between said calling station and said called line.

12. In a manual telephone system, a plurality of manual party lines, a plurality of stations on each of said lines, an operator's position including means for completing connections between said stations, a meter individual to each station, meter selecting equipment common to said lines, means individual to a calling one of said stations manually operated subsequent to the initiation of a call by said calling stations for operating said selecting equipment to select the meter individual to the calling station, and means including a circuit completed only in response to said selection of said calling station's individual meter for signalling said operator's position to indicate said initiated call to the selection of the calling station's individual meter.

13. In a manual telephone system, a plurality of manual party lines, a manual jack terminating each of said lines, a visual signal at each of said jacks, a plurality of stations on each of said party lines, an individual identification impulse sender at each of said stations for identification purposes only, a finder switch operated responsive to the initiation of a call by one of said stations for finding and connecting with the calling party line, circuit means controlled responsive to the manual operation of said individual impulse sender at said calling station for transmitting an identification signal corresponding to said calling station to said operated finder switch, an operator's position, and other circuit means associated with said finder switch completed only in response to the receipt of said identifying signal for operating one of said visual signals to inform the operator at said operator's position that a call has been initiated on the party line individual to said jack and said operated visual signal.

14. In a telephone system, a plurality of subscribers' lines, a meter individual to each line, metering equipment common to said lines operated in response to the initiation of a call by one of said lines for selecting the meter individual to said calling line, means for simultaneously transmitting pairs of matched pulses, and means for operating said selected meter by one of said pairs of matched pulses, one of said pulses being individual to said line and the other of said pulses being common to said lines.

15. In a telephone system, a plurality of subscribers' lines, a meter individual to each line, a meter conductor individual to each line and connected to the corresponding meter, metering equipment common to said lines operated in response to the initiation of a call on a calling one of said lines for selecting and connecting with the meter conductor individual to said calling line, a common meter conductor connected to all said meters, and means for simultaneously transmitting matched pulses over said selected individual meter conductor and over said common meter conductor to operate only said meter individual to said calling line.

16. In a telephone system, a plurality of party lines, a plurality of stations on each of said lines, a meter individual to each station, a line winding and a station winding in each meter, corresponding station windings of said meters being connected to each other and the line windings of said meters individual to each line being connected to each other, and means for operating only the calling station's individual meter by a pair of matched pulses over the calling station's line and station windings, one of said pulses being individual to said line of the calling station for energizing the line windings individual to the line of the calling station and the other pulse being common to stations corresponding to said calling station for energizing the station windings corresponding to the calling station.

17. In a telephone system, a plurality of party lines, a plurality of stations on each of said lines, a meter individual to each station, a line winding and a station winding in each meter, a line meter conductor individual to each line, a plurality of station meter conductors corresponding in number to the number of stations on any one of said lines, corresponding station windings of said meters being connected to the corresponding station meter conductor and the line windings of said meters individual to each line being connected to the corresponding line meter conductor, means for selecting the line meter conductor and the station meter conductor corresponding to a calling one of said lines and the calling station on said calling line, and means for simultaneously transmitting matched pulses over said selected line and station meter conductors to simultaneously energize the line winding and the station winding of the meter individual to said calling station to thereby operate only the calling station's individual meter.

18. In a telephone system, a plurality of party lines, a first and a second station on each of said party lines, a meter individual to each station, a line meter conductor individual to each line and connected to the first and second station meters of such line, a first common meter conductor common to all said first station meters, a second common meter conductor common to all said second station meters, metering equipment common to said lines operated in response to the initiation of a call by a station on one of said lines for selecting said meter conductor individual to said calling line and for selecting said first common meter conductor in case said calling station is the first station or for selecting said second common meter conductor in case said calling station is the second station, and means for simultaneously transmitting matched pulses over said selected individual and common meter conductors to operate only the meter individual to said calling station.

CLARENCE E. LOMAX.

REFERENCES CITED

The following references are of record in the file of this patent:

UNITED STATES PATENTS

| Number | Name | Date |
|---|---|---|
| 1,337,740 | Williams et al. | Apr. 20, 1920 |
| 1,387,171 | Polinkowsky | Aug. 9, 1921 |
| 1,799,654 | Stokely | Apr. 7, 1931 |
| 1,823,688 | Hovland | Sept. 15, 1931 |
| 1,852,746 | Gooderham | Apr. 5, 1932 |
| 2,222,099 | Zapf | Nov. 19, 1940 |
| 2,277,802 | Thies et al. | Mar. 31, 1942 |
| 2,319,424 | Maloney | May 18, 1943 |
| 2,410,520 | Ostline | Nov. 5, 1946 |